United States Patent Office.

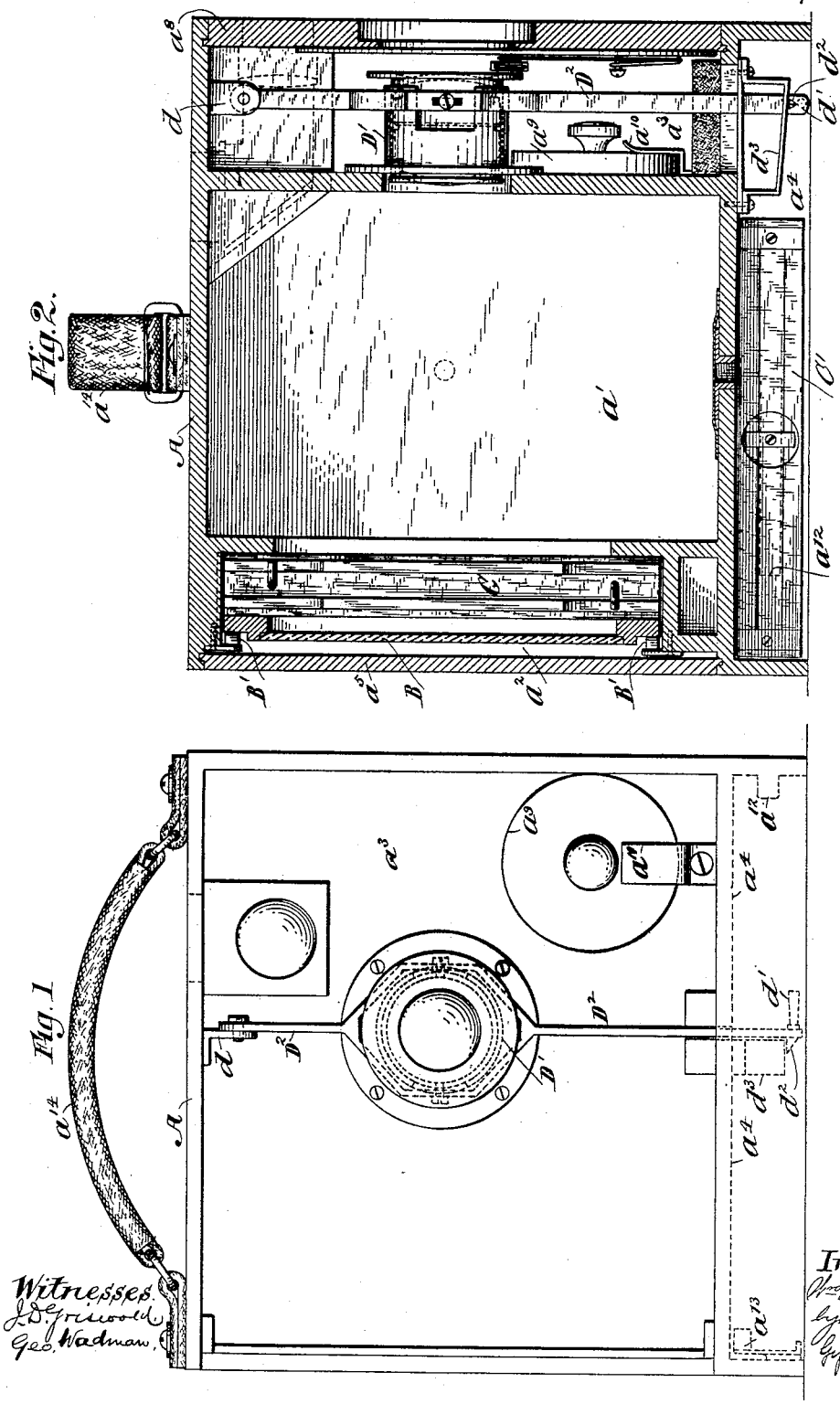

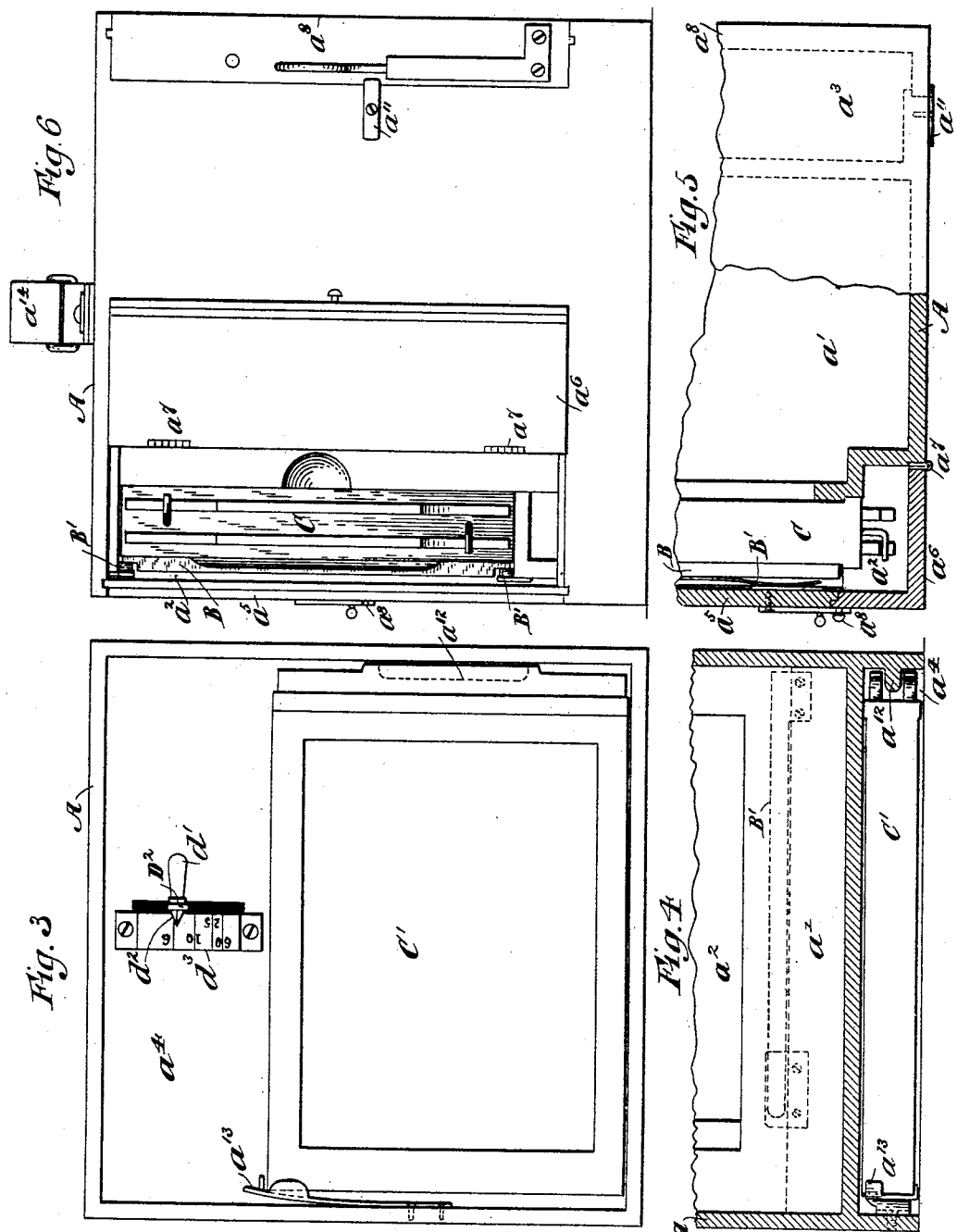

WILLARD H. FULLER, OF PASSAIC, NEW JERSEY, ASSIGNOR TO THE SCOVILL MANUFACTURING COMPANY, OF NEW YORK, N. Y.

PHOTOGRAPHIC CAMERA.

SPECIFICATION forming part of Letters Patent No. 391,236, dated October 16, 1888.

Application filed October 17, 1887. Serial No. 252,559. (No model.)

*To all whom it may concern:*

Be it known that I, WILLARD H. FULLER, of Passaic, county of Passaic, State of New Jersey, have invented a certain new and useful Improvement in Photographic Cameras, of which the following is a specification.

My improvement particularly relates to the kind of photographic cameras which are known as "detective" cameras.

The object of my improvement is to simplify and cheapen such cameras.

I will describe a camera embodying my improvement, and then point out the novel features in the claims.

In the accompanying drawings, Figure 1 is a front view of a camera embodying my improvement, the face of the case being removed. Fig. 2 is a central vertical longitudinal section of the same. Fig. 3 is an inverted plan or bottom view. Fig. 4 is a transverse vertical section of the lower portion of the camera. Fig. 5 is a horizontal section of certain portions of the camera. Fig. 6 is a side view of the camera.

Similar letters of reference designate corresponding parts in all the figures.

A designates the case of the camera. It is made in the form of a rectangular box and preferably of thin wood, so as to be as compact and light as possible. It is composed of four compartments or chambers, $a'$ $a^2$ $a^3$ $a^4$. The main chamber or compartment $a'$ has a focusing-plate, B, which is rendered free to move forwardly and backwardly by means of guides which are combined with its frame and with the case of the camera. Springs B', connected to the case of the camera and pressing against the frame of the focusing-plate B, serve to move said plate forwardly. This plate is located in the compartment $a^2$ of the case, which is rearward of the main chamber or compartment $a'$. The plate-holder may be slipped into the compartment $a^2$ in front of the glass plate B and its frame. I have represented a plate-holder, C, in place in the drawings.

The rear of the compartment $a^2$ is closed by a slide, $a^5$, which is provided with tongues or flanges at its edges. These tongues or flanges at their top and bottom edges fit in grooves in the walls of the compartments $a^2$, and the tongue or flange which is at the inner end of the slide also enters a groove in the contiguous wall of the compartment $a^2$. By means of the tongues or flanges and grooves a lap joint will be formed and light will be effectually excluded. At one corner the compartment $a^2$ is provided with a cover, $a^6$, which is made L-shaped in cross-section, connected at one edge by hinges $a^7$ to the main portions of the case of the camera, and adapted to be secured at the other edge by means of any suitable latch—as, for instance, a swinging latch, $a^8$, pivoted to the slide $a^5$, and adapted to engage with a screw or other projection upon said cover. The edge of the cover $a^6$, which is adapted to close against the slide $a^5$, is rabbeted, so as to fit and overlap the flange or tongue of the adjacent end of the slide. A lap-joint is also preferably provided between the main portion of the case and the cover where they come in contact.

The cover $a^6$ may be swung open to expose the end of the plate-holder C at which the handles of its sliding covers are located, so as to admit of the withdrawal of the said sliding covers at pleasure. It also provides for the insertion and removal of plate-holders. When closed, it conceals the plate holders and tends to relieve the apparatus of the appearance of a camera.

Forward of the main compartment or chamber $a'$ is a compartment or chamber, $a^3$. In it is located an adjustable lens-tube. This adjustable lens-tube fits within the tube D', which is fastened to the front of the partition separating the main compartment or chamber $a'$ from the compartment or chamber $a^3$. The adjustable lens-tube may be telescopically or longitudinally adjusted within the fixed tube. The adjustable lens-tube has combined with it a lever, $D^2$, which is pivotally connected at the upper end to a bracket, $d$, secured to the upper wall of the compartment $a^3$, and which at the lower end projects through a slot that extends lengthwise of the bottom of the compartment $a^3$. The middle portion of this lever is shown as formed into a yoke, which embraces the adjustable lens tube and is connected to it. As shown, the yoke portion of the lever is vertically slotted, and is connected to the adjustable lens-tube by means of screws passing loosely through its slots and entering tapped holes in said adjustable lens-tube.

The lower end of the lever $D^2$ is shown as extending into a compartment, $a^4$, which is located below the compartments $a'\ a^2\ a^3$. At its extremity it is provided with a handle, $d'$, by which it may be conveniently manipulated to shift the adjustable lens-tube lengthwise of the camera for the purpose of focusing. I have shown as combined with the lower end of this lever a pointer, $d^2$, which operates in conjunction with a scale-bar, $d^3$, which is graduated and marked so as to indicate the extent of adjustments of the adjustable lens-tube which may be made.

The front of the compartment $a^3$ is made in the form of a slide, $a^8$, and is provided with tongues or flanges on its edges, which enter grooves in the walls of the said compartment, forming joints which effectually exclude light. This slide $a^8$ is provided with a hole opposite the lens-tube. This opening may be closed by a cap or disk, $a^9$. When this cap or disk is not needed, it may be placed in the compartment $a^3$, and held there by a spring-finger, $a^{10}$.

I have shown a finder arranged partly within the upper portion of the compartment $a'$ and partly within the corresponding portion of the compartment $a^3$. Opposite this finder there is a hole in the slide $a^8$. The slide $a^8$ is provided upon its rear with shutter mechanism, which may be of any suitable kind. I have shown a fly-shutter mechanism as arranged upon it. The slide $a^8$ may be retained in place by a button, $a^{11}$, or other securing device.

The compartment $a^4$ is deep enough to contain another plate holder, $C'$. It is provided with means for retaining such plate-holder within it. As shown, it is provided with a bar, $a^{12}$, on one side of the wall and with a spring-catch, $a^{13}$, at the opposite side. The handles of the sliding covers of the plate-holders may be made to engage with the bar $a^{12}$ when the plate-holder is inserted, and then if the spring-catch be depressed the plate-holder may be swung into the compartment, and afterward the spring-catch may be released and will engage with and retain the plate-holder in position within the compartment. The space of the compartment $a^4$ is thus utilized in a very desirable manner.

The case of the camera may be provided with a handle, $a^{14}$, whereby the camera may be conveniently carried.

Of course this camera may be used with a stand, if desirable.

What I claim as my invention, and desire to secure by Letters Patent, is—

1. A photographic camera having a case divided by immovable partitions into four compartments, a main compartment or chamber at the middle, a forward compartment or chamber for accommodating an adjustable lens-tube, said adjustable lens-tube receiving support from a stationary tube mounted upon the immovable partition between said compartments, a rear compartment or chamber for accommodating a plate-holder, and a fourth compartment or chamber below those previously named and serving to contain a plate-holder, substantially as specified.

2. A photographic camera having a case divided by immovable partitions into three compartments or chambers, a main compartment or chamber at the middle, a forward compartment or chamber for accommodating an adjustable lens-tube and having its front made in the form of a slide, and a rear compartment or chamber for accommodating a plate-holder and having its back made in the form of a slide, substantially as specified.

3. A photographic-plate holder having a case comprising a main compartment or chamber and a rear compartment or chamber having its back made in the form of a slide, and having a hinged corner cover, substantially as specified.

4. A photographic camera having an adjustable lens tube and a lever embracing said adjustable lens-tube and extending through the case of the camera, substantially as specified.

5. In a photographic camera, the combination of a fixed tube, a telescopically or longitudinally adjustable lens-tube fitted thereto, and a lever fulcrumed to the case of the camera at one end and at the other end extending through the same and connected to an adjustable lens-tube between its ends, substantially as specified.

6. In a photographic camera, the combination of the fixed tube $D'$, the longitudinally-adjustable lens-tube $D$, and the lever $D^2$, having a yoke embracing said adjustable lens-tube, substantially as specified.

7. In a photographic camera, the combination of the fixed tube $D'$, the longitudinally-adjustable lens tube $D$, the lever $D^2$, having a yoke embracing said adjustable lens-tube, and the scale-bar $d^3$, substantially as specified.

8. In a photographic camera having a case provided with a main compartment or chamber and a chamber or compartment arranged beneath the same, a device for detachably securing a plate-holder within said last chamber, said device consisting of a bar adapted to engage the grooved side of said plate-holder, and a spring contacting with said plate-holder, substantially as specified.

WILLARD H. FULLER.

Witnesses:
JAMES D. GRISWOLD,
EDWIN H. BROWN.